Patented Dec. 28, 1948

2,457,542

UNITED STATES PATENT OFFICE 2,457,542

PROCESS OF THICKENING LATEX

Victor Golden, Chatham, N. J., assignor to The Patent and Licensing Corporation, New York, N. Y., a corporation of Massachusetts No Drawing. Application August 12, 1944, Serial No. 549,285

12 Claims. (Cl. 260—8)

This invention relates to the thickening of rubber latex and has for its principal object the provision of a latex thickened in such manner as to avoid substantially any increase in the water content thereof.

Another object of the present invention is to provide a novel and improved method by which the viscosity of latex may be substantially increased while avoiding any material increase in the water content thereof.

A common method for increasing the viscosity of latex, other than by causing agglomeration, destabilization or partial coagulation of the latex particles, is to add to the latex dilute aqueous solutions or dispersions of hydrophilic, gel-forming substances. These substances take up water and swell upon contacting the aqueous phase of the latex, thus rendering the latex more viscous without causing local coagulation, the extent of increase in viscosity depending upon the proportional amount of the water-swellable substance that is added. Among the various known substances that may be employed for the above purpose are glue, gelatine, soluble salts of alginic acid, such as algin, gum tragacanth, locust bean gum, Irish moss, karaya gum, various pectinates, water soluble cellulose esters, such as methyl cellulose, and the like.

Because of the swelling quality of these substances in water, as above indicated, it is necessary in preparing aqueous solutions or dispersions thereof to limit the concentrations to not more than 25% and, in the case of algin, to not more than about 2%, in order to retain the fluidity required for efficient handling. Thus, for every part of algin solids added to latex it is necessary to add approximately 49 parts of water. Since the amounts of such thickening agents ordinarily employed for thickening latex may range from 1% to about 15% by weight of the dry solids of the latex, it is manifest that the thickening of latex is thus accomplished only at the expense of a substantial increase of water content and therefore an undesirable reduction of the latex solids content. Furthermore, the additional amounts of water thus added, which may be as much as 50% or more, itself tends to reduce the viscosity of the latex and proportionately greater amounts of the gel-forming thickening agent are required than would ordinarily suffice to provide a given latex with a desired increase in viscosity.

In accordance with the present invention, the foregoing objections are avoided in a simple, economical and efficient manner by introducing into the latex a slurry or paste comprising a selected water-swellable thickening agent and a water miscible liquid in which the swellable substance is not soluble. For example, I may prepare a slurry or paste of algin, locust bean gum, or the like, in a suitable water miscible liquid, such as methyl alcohol or triethanolamine. This slurry or paste may have a solids content as high as about 40–50% and yet be sufficiently fluid for the purposes of this invention.

If desired, water may also be introduced to lower the viscosity of the slurry, increase rate of swelling upon addition to latex, and replace part of the amine or alcohol. The amount of water will vary according to the ratio of algin to alcohol or amine. In general, the higher the amine (or alcohol)–algin ratio, the more water may be introduced into the slurry without causing swelling therein. The exact proportions are readily determinable for each combination of thickening agent–water miscible slurrying agent.

The slurry or paste may be added directly to the latex, with stirring, whereupon the thickening agent combines with the aqueous serum of the latex (or aqueous phase of an artificially prepared latex). The combination of the aqueous serum or phase with the thickening agent causes the latter to swell; this swelling progressively increases with time due to the combination of more of the aqueous serum or phase with the thickening agent with resultant corresponding increase in the viscosity of the latex.

Instead of methyl alcohol or triethanolamine, above indicated, I may use butyl or ethyl alcohol, acetone, monoethanolamine, dimethylamine or diethylene triamine in preparing the slurry or paste of the thickening agent.

Certain of these liquids, such as alcohol, acetone, etc., ordinarily are coagulants for latex and will cause the rubber to separate from the dispersion as a solid mass when the rubber latex is mixed therewith. Such local coagulation of the latex does not occur, however, in the practice of the present invention, even though the slurry or paste of the thickening agent may contain 50–60% of the water miscible liquid.

The amount of thickening agent to be added to a latex is readily determinable by those familiar with this art and will depend entirely upon the initial character of the latex, i. e., solids content, pH, and viscosity, and the extent to which the viscosity is to be increased to serve in a particular use. In general from 1% to 15% by weight (based on the weight of the dry latex solids) of the thickening agent admixed with from 1% to 15% by weight (based on the weight of the dry latex solids) of a non-aqueous, water miscible liquid in which the agent is substantially insoluble may be mixed with the latex; preferably, however, from about .25 to 2 parts of a water-swelling thickening agent are added per 100 parts of dry latex solids, the thickening agent being added in the form of slurry or paste produced by mixing it with a relatively small amount of a non-aqueous, water miscible liquid in which the thickening agent is substantially insoluble.

The following is a typical formula illustrative of the practice of the invention:

|  | Solid Weight | Total Weight |
| --- | --- | --- |
| GR-S Latex,[2] Type 3, 37.94% solids | 100 | 263.6 |
| Algin QM | 2 | 2 |
| Triethanolamine |  | 3 |
| Water [1] |  | 2 |
|  | 102 | 270.6 |

[1] Addition of water optional.
[2] GR-S latex, as well known in the art, is a dispersion of butadiene styrene copolymers in an aqueous medium; the butadiene styrene copolymers are produced by polymerizing the butadiene and styrene constituents in an aqueous emulsion state.

The original latex, with a solids content of 37.94%, had a viscosity of 260 cps. The thickened latex compound has a solids content of 37.69% and a viscosity of 16,000 cps.

For the triethanolamine and water in the above formula, I may substitute 3 parts by weight of butanol and 2–2.5 parts of water, or 3 parts of butanol, acetone or ethyl alcohol without the addition of water.

To further illustrate the tremendous thickening effect on the latex of relatively small amounts or algin or one of the other similarly functioning water-swellable thickening agents employed in accordance with the present invention, I have increased the viscosity of the aforementioned latex from 260 cps. to 500 cps. with the addition of as little as .25 part of algin per 100 parts of dry latex solids. In other instances, I have obtained viscosity values of 1500 cps. and 6000 cps. by adding respectively .5 part and 1.0 part algin per 100 parts dry latex solids. In all of these cases, the solids content of the thickened latex was only slightly less than the solids content of the original latex.

The term "latex" is used herein to include natural and synthetic rubber dispersions in aqueous media.

I claim:

1. The process of thickening an aqueous dispersion of a rubber which comprises forming an intimate mixture of said dispersion with a small amount of a slurry of water-swellable thickening agent in a non-aqueous, water miscible liquid in which the said thickening agent is substantially insoluble, said water-swellable thickening agent combining with water originally present in the said dispersion to which said thickening agent is added, thereby producing a gel which causes thickening of the dispersion to take place.

2. A process as defined in claim 1, in which said slurry contains from 40% to 50% by weight of said thickening agent and the amount of slurry added is such as to incorporate in the dispersion from .25 to 2 parts of the thickening agent per 100 parts of dry rubber solids.

3. A process as defined in claim 1, in which the thickening agent is algin.

4. The process of thickening an aqueous dispersion of a rubbery butadiene styrene copolymer, which comprises mixing said dispersion with a slurry of algin in a non-aqueous, water miscible liquid in which algin is substantially insoluble.

5. The process of thickening an aqueous dispersion of a rubber butadiene styrene copolymer, which comprises mixing said dispersion with a slurry of algin in a non-aqueous, water miscible liquid in which algin is substantially insoluble, said slurry containing from 40% to 50% by weight of algin and being added to the dispersion in amount to incorporate therein from .25 to 2 parts of algin per 100 parts of butadiene styrene copolymer.

6. A rubber latex which has been thickened by intimately mixing the unthickened rubber latex with a slurry of a water swellable, gel-forming thickening agent in a non-aqueous, water miscible liquid in which the said thickening agent is substantially insoluble, said thickened rubber latex having a water content substantially unchanged from the water content of the unthickened rubber latex and having substantially the same percentage by weight of rubber solids as in the unthickened rubber latex.

7. A rubber latex which has been thickened by intimately mixing the unthickened rubber latex with from 1% to 15% by weight (based on the weight of dry rubber solids) of a water swellable, gel-forming thickening agent and from 1% to 15% by weight (based on the weight of dry rubber solids) of a non-aqueous, water miscible liquid in which the said thickening agent is substantially insoluble, said water swellable agent being swelled substantially entirely by the water originally present in said unthickened rubber latex and said thickened rubber latex having a water content substantially unchanged from the water content of the unthickened rubber latex and having substantially the same percentage by weight of rubber solids as in the unthickened rubber latex.

8. A rubber latex which has been thickened by intimately mixing the unthickened rubber latex with approximately .25 to 2 parts of a water swellable thickening agent (per 100 parts of dry rubber solids) and a small amount of a non-aqueous, water miscible liquid in which said thickening agent is substantially insoluble, said thickened rubber latex having a viscosity ranging between 500 to 16,000 centipoises, a water content substantially unchanged from the water content of the original unthickened rubber latex and having substantially the same percentage by weight of rubber solids as in the unthickened rubber latex.

9. A rubber latex which has been thickened by intimately mixing the unthickened rubber latex with a slurry of algin in a non-aqueous, water miscible liquid in which algin is substantially insoluble, said thickened rubber latex having a water content substantially unchanged from the water content of the original unthickened rubber latex and having substantially the same percentage by weight of rubber solids as in the unthickened rubber latex.

10. A thickened aqueous dispersion of a rubbery butadiene styrene copolymer produced by intimately mixing an unthickened aqueous dispersion of said rubbery butadiene styrene copolymer with a slurry of a water swellable, gel-forming thickening agent in a non-aqueous, water miscible liquid in which the said thickening agent is substantially insoluble, said thickened aqueous dispersion having a water content substantially unchanged from the water content of the unthickened aqueous dispersion and having substantially the same percentage by weight of rubbery butadiene styrene copolymer solids as in the unthickened aqueous dispersion.

11. A thickened aqueous dispersion of a rubbery butadiene styrene copolymer produced by intimately mixing an unthickened aqueous dispersion of said rubbery butadiene styrene copolymer with a slurry of algin in a non-aqueous, water miscible liquid in which the algin is substantially insoluble, said thickened aqueous dispersion having a water content substantially unchanged from the water content of the unthickened aqueous dispersion and having substantially the same percentage by weight of rubbery butadiene styrene copolymer solids as in the unthickened aqueous dispersion.

12. A thickened aqueous dispersion of a rubbery butadiene styrene copolymer having a water content substantially unchanged from the water content of the original unthickened aqueous dispersion, having substantially the same percentage by weight of rubbery butadiene styrene copolymer solids as in the unthickened aqueous dispersion and produced by mixing an unthickened aqueous dispersion of a rubbery butadiene styrene copolymer with from 1% to 15% by weight (based on the weight of dry butadiene styrene copolymer solids) of a water swellable, gel-forming thickening agent and from 1% to 15% by weight (based on the weight of dry butadiene styrene copolymer solids) of a non-aqueous, water miscible liquid in which the said thickening agent is substantially insoluble.

VICTOR GOLDEN.

REFERENCES CITED

The following references are of record in the file of this patent:

UNITED STATES PATENTS

| Number | Name | Date |
|---|---|---|
| 2,117,258 | Schidrowitz et al. | May 10, 1938 |
| 2,229,879 | Allison | Jan. 28, 1941 |
| 2,332,902 | D'Angremond et al. | Oct. 26, 1943 |
| 2,405,724 | Wilder | Aug. 13, 1946 |